(12) United States Patent
Andersson et al.

(10) Patent No.: US 7,384,674 B2
(45) Date of Patent: Jun. 10, 2008

(54) PACKAGING LAMINATE FOR A RETORTABLE PACKAGING CONTAINER

(75) Inventors: Thorbjörn Andersson, Södra Sandby (SE); Ib Leth, Kävlinge (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 197 days.

(21) Appl. No.: 10/491,914

(22) PCT Filed: Oct. 18, 2002

(86) PCT No.: PCT/SE02/01901

§ 371 (c)(1),
(2), (4) Date: Sep. 1, 2004

(87) PCT Pub. No.: WO03/035503

PCT Pub. Date: May 1, 2003

(65) Prior Publication Data

US 2005/0008800 A1    Jan. 13, 2005

(30) Foreign Application Priority Data

Oct. 22, 2001   (SE) .................................... 0103507

(51) Int. Cl.
*B29D 22/00*   (2006.01)
*B29D 23/00*   (2006.01)
*B32B 1/08*   (2006.01)

(52) U.S. Cl. .................... 428/36.7; 428/36.6; 428/218; 428/458; 428/461; 428/511

(58) Field of Classification Search ............ 428/34.2, 428/35.7, 35.8, 35.9, 36.6, 36.7, 36.91, 217, 428/458, 461, 511, 515

See application file for complete search history.

(56) References Cited

U.S. PATENT DOCUMENTS 3,972,467 A   8/1976 Whillock et al.
4,753,832 A   6/1988 Brown et al.
5,527,622 A * 6/1996 Kato et al. ............... 428/481
5,849,380 A * 12/1998 Kashiba et al. .......... 428/36.6

FOREIGN PATENT DOCUMENTS

| EP | 0124772 | 11/1984 |
|---|---|---|
| EP | 0287083 | 10/1988 |
| EP | 0318771 | 6/1989 |
| EP | 0341937 | 11/1989 |
| EP | 0532766 | 3/1993 |

* cited by examiner

Primary Examiner—Michael Miggins
(74) Attorney, Agent, or Firm—Buchanan Ingersoll & Rooney PC

(57) ABSTRACT

A packaging laminate for a retortable packaging container, the packaging laminate (30) including a paper or paperboard layer (31), outer, liquid-tight coatings (32; 33) and an aluminium foil (34) serving as gas barrier between the paper or paperboard layer (31) and one of the two outer liquid-tight coatings (32). In order to compensate for or counteract possible loss of gas tightness because of crack formations or similar untightness in the tensile-sensitive aluminium foil (34), the packaging laminate (30) includes at least one additional layer (35) serving as gas barrier between the paper or paperboard layer (31) and the aluminium foil (34). Preferably, said at least one additional gas barrier layer (35) is bonded to the paper or paperboard layer (31) by an interjacent lamination or adhesive layer (36) of polypropylene or other olefin polymer, whereby the thickness or quantity of the additional gas barrier layer (36) may be reduced without deterioration in gas tightness properties in the finished packaging container.

20 Claims, 1 Drawing Sheet

PACKAGING LAMINATE FOR A RETORTABLE PACKAGING CONTAINER

TECHNICAL FIELD

Figure 1:
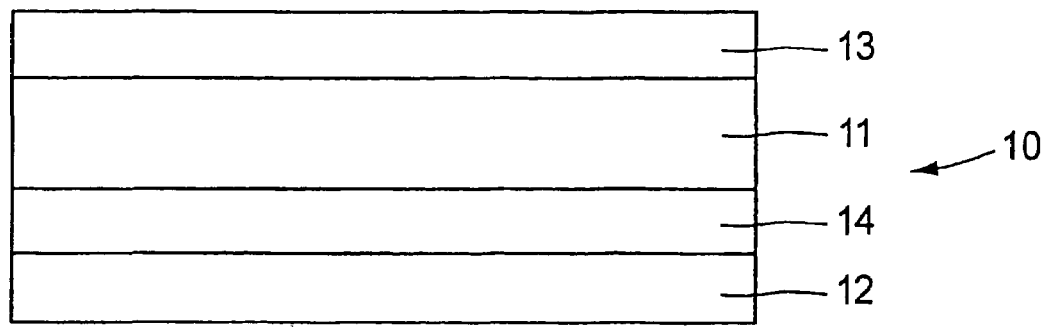

The present invention relates to a packaging laminate for a retortable packaging container comprising a core layer, outer, liquid-tight coatings and an aluminium foil between the core layer and the one outer coating and serving as a gas barrier.

BACKGROUND ART

A packaging laminate of the type which is described above is known from, for example, international patent application carrying publication number WO97/02140. The prior art packaging laminate has a rigid, but foldable core layer of paper or paperboard and outer, liquid-tight coatings of moisture and heat resistant plastic material on both sides of the core layer. In order to impart to the prior art packaging laminate tightness properties also against gases, in particular oxygen gas, the packaging laminate moreover displays an aluminium foil which serves as gas barrier and which is disposed between the paper or paperboard layer and the one outer plastic coating.

From the prior art packaging laminate, retortable packaging containers are produced with the aid of filling machines of the type which, from a web or from prefabricated blanks of the packaging laminate, form fill and seal finished packages in accordance with the so-called form/fill/seal principle well-known in packaging contexts.

From, for example, a flat folded tubular packaging blank of the prior art packaging laminate, retortable packaging containers are produced in that the packaging blank is first raised to an open, tubular packaging carton which is sealed at its one end by fold forming and thermosealing of continuous, foldable end panels of the packaging carton, for the formation of a substantially planar bottom closure. The packaging carton provided with a bottom is filled with the relevant contents, e.g. food, through its open end which is thereafter sealed by an additional fold forming and thermosealing of corresponding end panels of the packaging carton for the formation of a substantially planar top closure. The filled and sealed, normally parallelepipedic packaging container is thereafter ready for a heat treatment in order to impart to the packed contents or food extended shelf-life in its unopened packaging container.

A heat treatment which extends shelf-life may suitably be carried into effect in the manner and under the conditions described in international patent application carrying publication number WO98/16431 which is hereby incorporated as reference. The packaging container is, in this instance, placed in a retort and is heated therein with the aid of a first gaseous medium flowing in contact with the outer walls of the packaging container, e.g. hot steam, to a temperature generally within the range of 70-130° C. After a predetermined stay time at the selected temperature, the supply of the gaseous medium is discontinued. The packaging container is cooled with a second, circulating gaseous medium, e.g. cold air, and finally with a circulating liquid medium, e.g. cold water. The cooled, retorted packaging container is thereafter removed from the retort for storage, transport and/or other handling.

Even if a packaging container of the prior art packaging laminate withstands, in normal cases, a rough heat treatment which retorting entails, it nevertheless not seldom occurs that the aluminium foil embodied as gas barrier is, during the reforming of the packaging laminate into packaging containers, subjected to such powerful tensile stresses that it cracks in particularly exposed regions of the packaging laminate. The occurrence of cracks in the tensile-sensitive aluminium foil entails that the packaging container correspondingly loses tightness properties against gases which can thereby penetrate into the packaging container and come into contact with the packed product. The problem with undesirable penetration of gases through cracks which have occurred in the aluminium foil becomes particularly serious in those cases when the packed product is particularly sensitive to the action of gases, e.g. oxygen gas, which may very rapidly destroy a product and render it unusable.

One object of the present invention is, therefore, to obviate the above-described drawback in connection with the prior art packaging laminate.

A further object of the present invention is to provide a packaging laminate of the type described by way of introduction which may readily be reformed by fold forming and thermosealing into a retortable packaging container without the risk that the packaging container loses its desirable tightness properties against gases, in particular oxygen gas, even if the tensile-sensitive aluminium foil is subjected to crack formation and similar untightness during fold forming of the packaging laminate.

Yet a further object of the present invention is to provide a retortable packaging container produced from the packaging laminate for perishable and oxygen gas-sensitive food products.

These and other objects and advantages will be obtained according to the present invention by a packaging laminate and by a packaging container produced from the packaging laminate as described herein. Expedient embodiments of the packaging laminate according to the present invention have further been given characterizing features as described herein.

SUMMARY OF THE INVENTION

Thus, the present invention provides a packaging laminate for a retortable packaging container comprising a core layer, outer, liquid-tight coatings and an aluminium foil which serves as a gas barrier and which is disposed between the core layer and the one outer coating, the packaging laminate including, for the purpose of promoting gas tightness, a further layer serving as gas barrier between the core layer and the aluminium foil.

The present invention also provides a retortable packaging container for particularly perishable and oxygen gas-sensitive products produced by fold forming and sealing of the packaging laminate according to the present invention.

BRIEF DESCRIPTION OF THE ACCOMPANYING DRAWING

Figure 2:
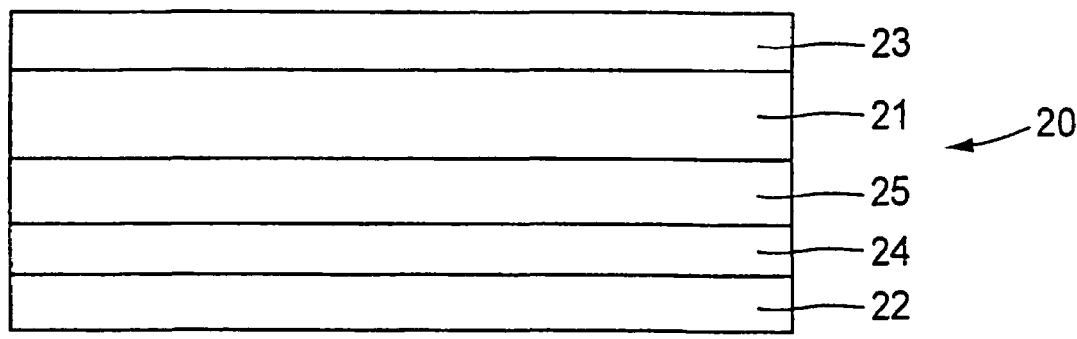
Figure 3:
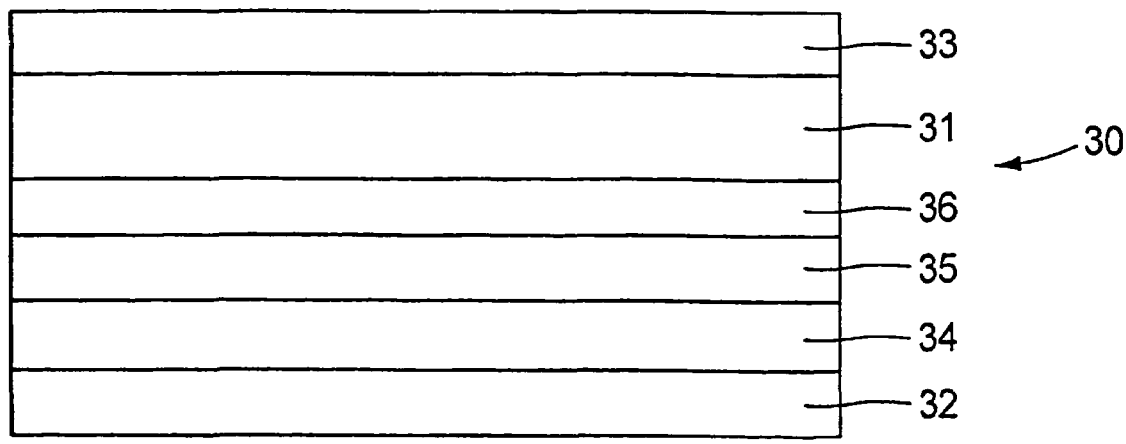

The present invention will now be described and explained in greater detail hereinbelow with particular reference to the accompanying Drawing. In the accompanying Drawing:

FIG. 1 schematically shows the general structure of a packaging laminate for a retortable packaging container according to the prior art technology;

FIG. 2 schematically shows the general structure of a packaging laminate for a retortable packaging container according to a first embodiment of the present invention; and FIG. 3 schematically shows the general structure of a packaging laminate for a retortable packaging container according to a preferred embodiment of the present invention.

DETAILED DESCRIPTION OF EMBODIMENTS AND THE ACCOMPANYING DRAWING

FIG. 1 shows the general structure of a prior art packaging laminate carrying the generic reference numeral 10. The packaging laminate 10 has a rigid, but foldable core layer 11 of paper or paperboard, as well as outer, liquid-tight coatings 12 and 13 on both sides of the core layer 11. The packaging laminate 10 further displays an aluminium foil 14 serving as gas barrier and disposed between the core layer 11 and the one outer, liquid-tight coating 12.

From the prior art packaging laminate 10, a retortable packaging container is produced in a per se known manner by fold forming and thermosealing of a sheet-or web-shaped blank of the packaging laminate 10. From, for example, a flat-folded tubular packaging blank, such a retortable packaging container is produced in that the packaging laminate is first raised to an open, tubular packaging carton whose one end is sealed by fold forming and thermosealing of continuous, foldable end panels of the packaging carton for the formation of a substantially planar bottom closure. The packaging carton with the closed bottom is filled with the relevant contents, e.g. a food, through its open end and is thereafter given a substantially planar top closure by additional fold forming and thermosealing of corresponding continuous, foldable end panels of the packaging carton. The thus filled and closed, normally parallelepipedic packaging container is thereafter ready for a heat treatment in a retort in order to impart to the packed contents or food so-called extended shelf-life in the unopened packaging container.

The problem inherent in the prior art packaging laminate 10 is, as has already been described, that the aluminium foil 14 included in the packaging laminate can, because of its tensile sensitivity, crack, in particular in areas where tensile stresses on the aluminium foil are particularly powerful during the reforming of the packaging laminate into a packaging container, and that the produced packaging container thereby loses tightness properties against gases. Such cracks and similar untightness in the aluminium foil of the packaging laminate can, in certain cases, be so extensive and serious that the packaging container becomes totally unusable, in particular if the packaging container is intended to be used for particularly perishable and oxygen gas-sensitive foods which would rapidly be destroyed and deteriorate in quality if they came into contact with oxygen gas.

The problem in connection with the above-described, prior art packaging laminate 10 is solved in a simple manner and using simple means by a packaging laminate according to the present invention with a structure illustrated schematically in FIG. 2.

The packaging laminate carrying the generic reference numeral 20 in FIG. 2 similarly displays a rigid, but foldable core layer 21 of paper or paperboard and outer, liquid-tight coatings 22 and 23. Between the core layer 21 and the one outer, liquid-tight coating 22, the packaging laminate 20 has an aluminium foil 24 serving as gas barrier.

The packaging laminate 20 according to the present invention differs from the prior art packaging laminate 10 in FIG. 1 principally in that it displays, between the aluminium foil 24 and the core layer 21, an additional layer 25 serving as gas barrier in order to compensate for or counteract possible cracks which may occur in the aluminium foil 24 when the packaging laminate 20 is reformed into a packaging container.

Preferred materials for the additional or supplementary gas barrier layer 25 in the packaging laminate 20 according to the present invention may be selected from the group essentially comprising polyethylene terephthalate (PET), amorphous polyethylene terephthalate (APET), cyclic olefin copolymers (COC), polyamide (PA), amorphous polyamide (APA), liquid crystalline polymers (LCP), ethylene vinyl alcohol. copolymers (EVOH) and polyvinyl alcohol (PVOH) which may possibly be applied on a thin carrier layer, such as, for example, paper.

The outer, liquid-tight coating 23 may be a plastic which is selected from the group essentially comprising polyethylene (PE), polypropylene (PP) and polyester (PET), or mixtures thereof. Examples of a usable polyethylene plastic may be high density polyethylene (HDPE) or linear low density polyethylene (LLDPE), an example of a usable polypropylene plastic may be oriented polypropylene (OPP), and an example of a usable polyester plastic may be amorphous polyester (APET).

Preferably, the liquid-tight coating 23 consists of a physical or mechanical mixture of polypropylene (PP) and polyethylene (PE) which, in addition to superior tightness properties against liquid, also has sufficient moisture and heat resistance to withstand such extreme moisture and temperature stresses as occur in a normal heat treatment in a retort for extending shelf-life. An outer coating 23 of a physical or mechanical mixture of polypropylene (PP) and polyethylene (PE) moreover displays superior printability, at the same time as making for mechanically strong and liquid-tight seals by thermosealing when the packaging laminate 20 is reformed into retortable packaging containers.

The thickness or quantity of the outer, liquid-tight coating 23 may vary within broad limits, but is generally 25-45 g/m$^2$.

Correspondingly, the outer, liquid-tight coating 22 may consist of a plastic which is selected from the group essentially comprising polyethylene (PE), polypropylene (PP), polyester (PET) and copolymers thereof. An example of a usable polyethylene plastic may be a high density polyethylene (HDPE) or a linear low density polyethylene (LLDPE) and an example of a usable polyester plastic may be an amorphous polyester (APET).

Preferably, the liquid-tight coating 22 consists of a copolymer of propylene and ethylene which is sufficiently moisture and heat-resistant to withstand extreme moisture and temperature stresses which occur in a normal heat treatment in a retort intended to extend shelf-life. A coating of a copolymer of propylene and ethylene moreover makes for mechanically strong and liquid-tight seals when the packaging laminate 20 is reformed into a packaging container for retorting purposes.

The thickness or quantity of the outer plastic coating 22 may vary within broad limits, but is generally within the range of 25-35 g/m$^2$.

While a packaging container which is produced by fold forming and sealing of the prior art packaging laminate 10 in FIG. 1 not seldom loses desirable tightness properties against gases, in particular oxygen gas, because of cracks which may occur in the aluminium foil 14 when the packaging laminate 10 is reformed into a packaging container, this risk is effectively counteracted or obviated by the layer 25 employed as an additional gas barrier between the core layer 21 and the aluminium foil 24 in the packaging laminate 20 according to the present invention. The quantity or thickness of the layer 25 in the illustrated embodiment is in general 10-30 g/m².

FIG. 3 schematically illustrates a packaging laminate 30 according to one preferred embodiment of the present invention. The packaging laminate 30 includes a rigid, but foldable core layer 31 of paper or paperboard and outer, liquid-tight coatings 32 and 33. Between the core layer 31 and one of the two outer, liquid-tight coatings 32, the packaging laminate 30 has an aluminium foil 34 serving as gas barrier.

The packaging laminate 30 according to this preferred embodiment differs from the prior art packaging laminate 10 in FIG. 1 in the same manner as the packaging laminate 20 in FIG. 2 principally in that, between the aluminium foil 34 and the core layer 31, it has an additional layer 35 serving as gas barrier to compensate for or counteract possible cracks which may occur in the aluminium foil 34 when the packaging laminate 30 is reformed into a packaging container.

Preferred materials for the additional or supplementary gas barrier layer 35 in the packaging laminate 30 may be selected from the group essentially comprising polyethylene terephthalate (PET), amorphous polyethylene terephthalate (APET), cyclic olefin copolymers (COC), polyamide (PA), amorphous polyamide (APA), liquid crystalline polymers (LCP), ethylene vinyl alcohol copolymers (EVOH) and polyvinyl alcohol (PVOH) which may optionally be applied on a thin carrier layer, such as, for example, paper.

The outer, liquid-tight coating 33 may be a plastic which is selected from the group essentially comprising polyethylene (PE), polypropylene (PP) and polyester (PET), or mixtures thereof. Examples of a usable polyethylene plastic may be high density polyethylene (HDPE) or linear low density polyethylene (LLDPE), an example of a usable polypropylene plastic may be oriented polypropylene (OPP) and an example of a usable polyester plastic may be amorphous polyester (APET). Preferably, the liquid-tight coating 33 consists of a physical or mechanical mixture of polypropylene (PP) and polyethylene (PE) which, in addition to superior tightness properties vis-à-vis liquid, also displays sufficient moisture and heat-resistance to withstand such extreme moisture and temperature stresses as occur in a normal heat treatment in a retort for extending shelf-life. An additional coating 33 of a physical or mechanical mixture of polypropylene (PP) and polyethylene (PE) moreover displays superior printability, at the same time as it makes for mechanically strong and liquid-tight seals by thermosealing when the packaging laminate 33 is reformed into retortable packaging containers.

The thickness or quantity of the outer liquid-tight coating 33 may vary within broad limits, but is in general within the range of 25-45 g/m².

Correspondingly, the outer, liquid-tight coating 32 may consist of a plastic which is selected from the group essentially comprising polyethylene (PE), polypropylene (PP), polyester (PET) and copolymers thereof. Examples of a usable polyethylene plastic may be a high density polyethylene (HDPE) or a linear low density polyethylene (LLDPE) and an example of a usable polyester plastic may be an amorphous polyester (APET).

Preferably, the liquid-tight coating 32 consists of a copolymer of propylene and ethylene which is sufficiently moisture and heat-resistant to withstand extreme moisture and temperature stresses which occur in a normal heat treatment for extending shelf-life which is carried out in a retort. A coating of a copolymer of propylene and ethylene moreover makes for mechanically strong and liquid-tight seals when the packaging laminate 30 is reformed into a packaging container for retorting purposes.

The thickness or quantity of the outer plastic coating 32 may vary within broad limits, but is in general within the range of 25-35 g/m².

As is illustrated schematically in FIG. 3, the layer 35 used as additional gas barrier is bonded to the core layer 31 by at least one interjacent lamination or adhesive layer 36. By a suitable selection of material in the interjacent lamination or adhesive layer 36, among others the advantage will be gained in comparison with the packaging laminate 20 in FIG. 2 that the quantity or thickness of the layer 35 employed as additional gas barrier may be made thinner without the tightness properties of the packaging laminate 30 being negatively affected. Examples of such a material in the layer 36 may be polypropylene (PP) or other olefin polymer with which the thickness of the additional gas barrier layer 35 may be made as thin as 5-20 g/m² with gas tightness properties of substantially the same order of magnitude as the packaging laminate 20 in FIG. 2 which does not employ such an interjacent layer of polypropylene or other olefin polymer.

The packaging laminate 30 according to the preferred embodiment of the present invention illustrated in FIG. 3 is thus a more economical, but just as efficient packaging laminate as the packaging laminate 20 for a retortable packaging container which is intended principally for particularly perishable and oxygen gas-sensitive products such as foods.

It will thus be apparent from the foregoing description that the present invention, by merely a simple modification of the prior art packaging laminate, provides a packaging laminate which, by fold forming and sealing, may be reformed into a retortable packaging container possessing sufficiently good tightness properties against gases, in particular oxygen gas, in order reliably to be able to store particularly perishable and oxygen gas-sensitive products such as foods.

Naturally, the present invention is not restricted to the embodiments illustrated and described by way of example, but numerous various alterations and modifications are conceivable without departing from the inventive concept as this is defined by the appended claims.

What is claimed is:

1. A packaging laminate for a retortable packaging container, the packaging laminate comprising:
a core layer having a first surface and a second surface;
a first outer liquid-tight coating on the first surface, the first outer liquid-tight coating being of polypropylene, polyester, high density polyethylene, linear low density polyethylene, mixtures thereof, or a mixture of polypropylene and polyethylene;
a second outer liquid-tight coating over the second surface, the second outer liquid-tight coating being of polypropylene, polyester, high density polyethylene, linear low density polyethylene, or copolymers of the monomers thereof;
an aluminum foil serving as gas barrier and disposed between the second surface of the core layer and the second outer liquid-tight coating;
at least one additional layer serving as gas barrier between the second surface of the core layer and the aluminum foil, wherein the at least one additional layer consists of a material selected from the group consisting of cyclic olefin copolymers (COC), ethylene vinyl alcohol copolymers (EVOH) and polyvinyl alcohol (PVOH); and at least one interjacent adhesive layer of polypropylene bonding the second surface of the core layer to the at least one additional layer.

2. The packaging laminate as claimed in claim 1, wherein the core layer is a rigid, but foldable layer of paper or paperboard.

3. The packaging laminate as claimed in claim 1, wherein said at least one additional layer serving as gas barrier consists of an ethylene vinyl alcohol copolymer (EVOH).

4. The packaging laminate as claimed in claim 1, wherein the quantity or thickness of said at least one additional layer serving as gas barrier is 10-30 g/m$^2$.

5. The packaging laminate as claimed in claim 1, wherein the quantity or thickness of said at least one additional layer serving as gas barrier is 5-10 g/m$^2$.

6. A packaging container comprising a fold formed and thermosealed packaging laminate as claimed in claim 1, wherein the packaging container has been heat treated in a rotort and is gas-tight.

7. The packaging laminate as claimed in claim 1, which comprises more than one adhesive layer of polypropylene.

8. The packaging laminate as claimed in claim 1, wherein:
the first and second outer, liquid-tight coatings are of polypropylene; and
the at least one additional layer serving as gas barrier layer consists of EVOH.

9. The packaging laminate as claimed in claim 1, wherein:
the first outer liquid-tight coating is of a mixture of polypropylene and polyethylene;
the second outer liquid-tight coating is of a copolymer of the monomers of (i) polypropylene and high density polyethylene or (ii) polypropylene and linear low density polyethylene; and
the at least one additional layer serving as gas barrier layer consists of EVOH.

10. A packaging laminate for a retortable packaging container, the packaging laminate consisting essentially of:
a core layer having a first surface and a second surface;
a first outer liquid-tight coating on the first surface, the first outer liquid-tight coating being of polypropylene, polyester, high density polyethylene, linear low density polyethylene, mixtures thereof, or a mixture of polypropylene and polyethylene;
a second outer liquid-tight coating over the second surface, the second outer liquid-tight coating being of polypropylene, polyester, high density polyethylene, linear low density polyethylene, or copolymers of the monomers thereof;
an aluminum foil between the second surface of the core layer and the second outer liquid-tight coating;
at least one gas barrier layer between the second surface of the core layer and the aluminum foil, wherein the at least one additional layer consists of a material selected from the group consisting of cyclic olefin copolymers (COC), ethylene vinyl alcohol copolymers (EVOH) and polyvinyl alcohol (PVOH); and
at least one interjacent adhesive layer of polypropylene bonding the second surface of the core layer to the at least one gas barrier layer.

11. The packaging laminate as claimed in claim 10, wherein the at least one gas barrier layer consists of a material selected from the group consisting of ethylene vinyl alcohol copolymers (EVOH), polyethylene terephthalate (PET), amorphous polyethylene terephthalate (APET), cyclic olefin copolymers (COC), polyamide (PA), amorphous polyamide (APA), liquid crystalline polymers (LCP) and polyvinyl alcohol (PVOH).

12. The packaging laminate as claimed in claim 10, wherein the quantity or thickness of the at least one gas barrier layer is 10-30 g/m$^2$.

13. The packaging laminate as claimed in claim 10, wherein the quantity or thickness of the at least one gas barrier layer is 5-10 g/m$^2$.

14. A packaging container comprising a fold formed and thermosealed packaging laminate as claimed in claim 10, wherein the packaging container has been heat treated in a retort and is gas-tight.

15. The packaging laminate as claimed in claim 10, which comprises more than one adhesive layer of polypropylene.

16. The packaging laminate as claimed in claim 10, wherein:
the first and second outer, liquid-tight coatings are of polypropylene; and
the at least one additional layer serving as gas barrier layer consists of EVOH.

17. A packaging laminate for a retortable packaging container, the packaging laminate comprising:
a core layer having a first surface and a second surface;
a first outer liquid-tight coating on the first surface, the first outer liquid-tight coating being of polypropylene, polyester, high density polyethylene, linear low density polyethylene, mixtures thereof, or a mixture of polypropylene and polyethylene;
a second outer liquid-tight coating over the second surface, the second outer liquid-tight coating being of polypropylene, polyester, high density polyethylene, linear low density polyethylene, or copolymers of the monomers thereof;
an aluminum foil between the second surface of the core layer and the second outer liquid-tight coating;
at least one gas barrier layer between the second surface of the core layer and the aluminum foil, the at least one gas barrier layer consists of a material selected from the group consisting of ethylene vinyl alcohol copolymers (EVOH), cyclic olefin copolymers (COC), and polyvinyl alcohol (PVOH), and the at least one gas barrier layer has a quantity or thickness of 5-20 g/m$^2$; and
at least one interjacent adhesive layer of polypropylene bonding the second surface of the core layer to the at least one additional layer.

18. A packaging container comprising a fold formed and thermosealed packaging laminate as claimed in claim 17, wherein the packaging container has been heat treated in a retort and is gas-tight.

19. The packaging laminate as claimed in claim 17, which comprises more than one adhesive layer of polypropylene.

20. The packaging laminate as claimed in claim 17, wherein:
the outer, liquid-tight coatings are of polypropylene; and
the at least one additional layer serving as gas barrier layer consists of EVOH and has a quantity of 5-10 g/m$^2$.

* * * * *